(12) United States Patent
Kiliccote

(10) Patent No.: US 7,021,534 B1
(45) Date of Patent: Apr. 4, 2006

(54) METHOD AND APPARATUS FOR PROVIDING SECURE DOCUMENT DISTRIBUTION

(76) Inventor: Han Kiliccote, 1901 Alford Ave., Los Altos, CA (US) 94024

( * ) Notice: Subject to any disclaimer, the term of this patent is extended or adjusted under 35 U.S.C. 154(b) by 0 days.

(21) Appl. No.: 11/084,294

(22) Filed: Mar. 18, 2005

Related U.S. Application Data

(60) Provisional application No. 60/626,146, filed on Nov. 8, 2004, provisional application No. 60/632,756, filed on Dec. 3, 2004.

(51) Int. Cl.
*G06K 5/00* (2006.01)
(52) U.S. Cl. .................. 235/380; 713/170; 382/306
(58) Field of Classification Search ............... 382/306
See application file for complete search history.

(56) References Cited

U.S. PATENT DOCUMENTS

| | | | | |
|---|---|---|---|---|
| 5,606,609 A | * | 2/1997 | Houser et al. | 713/179 |
| 5,873,735 A | * | 2/1999 | Yamada et al. | 434/316 |
| 6,757,826 B1 | * | 6/2004 | Paltenghe | 713/170 |
| 6,937,989 B1 | * | 8/2005 | McIntyre et al. | 705/1 |
| 6,950,800 B1 | * | 9/2005 | McIntyre et al. | 705/1 |
| 2002/0004902 A1 | * | 1/2002 | Toh et al. | 713/170 |
| 2003/0161475 A1 | * | 8/2003 | Crumly et al. | 380/280 |
| 2004/0064704 A1 | * | 4/2004 | Rahman | 713/182 |

FOREIGN PATENT DOCUMENTS

JP            2004126763 A  *  4/2004

* cited by examiner

*Primary Examiner*—Uyen-Chau N. Le
(74) *Attorney, Agent, or Firm*—McDermott Will & Emery LLP

(57) ABSTRACT

A system for providing secure document distribution includes an application configured to: allow an author to create a document and secure the document using an access code, generate an image having the access code encoded in an encrypted format, forward a message to a recipient. The message includes the document and the image. A terminal configured to allow the recipient to open the message and a portable device configured to: allow the recipient to capture the image and to decrypt the access code embedded in the image, capture input information from the recipient, the input information to be used to ensure that the recipient is authorized to use the portable device, and generate an output including the access code. The terminal receives the output generated by the portable device and evaluates the output to determine if the recipient is allowed to access the document.

22 Claims, 13 Drawing Sheets

METHOD AND APPARATUS FOR PROVIDING SECURE DOCUMENT DISTRIBUTION

BACKGROUND

1. Field

The present invention relates generally to secure transactions, and more specifically, to methods and devices for providing secure identification, verification and authorization using a portable secure device.

2. Background

There are many applications where authentication can be useful including, for example, e-commerce transactions, secure system access, etc. Authentication technologies are generally implemented to verify the identify of a user prior to allowing the user to have ability to perform certain tasks, such as, accessing confidential information or conducting authorized transactions. Many authentication systems are known in the art and the methodologies associated with these systems cover a wide range of techniques.

The use of credit and debit cards to conduct payment transactions is very popular. Credit and debit cards can be used for paying telephone charges and purchase transactions. With the burgeoning growth of online or e-commerce, the use of credit and debit cards to pay for online transactions is also increasing. Such increase use of credit and debit cards also results in increase in identity theft crimes including credit card fraud. In response, card issuers are employing various different measures in order to minimize and/or prevent such crimes. For example, in order to provide sufficient authentication, a user may be required to provide additional information during the card approval process, such as, certain numbers printed on the back of the card, the postal zip code for the billing address associated with the card, or a persona identification number (PIN) linked to the card. Because such information is static, it may be of nominal effectiveness.

In one existing system, an apparatus is provided for identifying an individual. The apparatus employs a static value and a dynamic variable to generate passwords. For every transaction to be completed, a fixed code is entered into the card by the user at the start of the access request procedure. This fixed code constitutes the static value. The dynamic variable is produced which varies dynamically as a function of time. The static value and the dynamic variable are next used as input parameters of a secret encryption algorithm implemented in order to produce a password in the card. This password is displayed on the card and the user is invited to transfer it to a server. The fixed code is also transferred to the server. The server then calculates the password by using the same encryption algorithm and the dynamic variable. The password generated by the password is compared with the password transmitted to the server by the user. In the event of matching, authorization for access to the function can be delivered. It will be noted that the dynamic variable is a time-dependent dynamic value. Since this variable is necessarily produced independently, both in the card and in the server, the clocks of these two facilities used to produce the dynamic variable on each side must be synchronized with a given accuracy. As a result, the apparatus requires time-dependent synchronization and shared secret keys.

Another existing system discloses a method and apparatus for secure credit card transactions. This apparatus comprises an authorization computer and a credit card that work in conjunction with each other to enhance the security of credit card transactions. More specifically, the system includes a smart credit card that has a microprocessor, associated memories and a liquid crystal display. The credit card is used to produce a unique verification number by processing a transaction sequence number with an encryption algorithm. The verification number is then displayed in the display device, and can be transmitted to the authorization computer along with a customer identifying account number. The computer, which is used for authorizing the credit card transactions for the customers of the credit card issuer, uses the account number to access an account file for the credit cardholder. The account file contains a de-encryption algorithm, which is complementary to the encryption algorithm of the credit card, such that the computer can use the de-encryption algorithm together with the verification number to produce a computed transaction sequence number. Both transaction sequence numbers, the one in the card and the one in the computer, are changed by increment after the authorized transaction so that a different verification number is generated and used in the authorization in each subsequent credit card transaction. Synchronization between the card and the computer is required.

In another existing system, a portable information and transaction processing system and method utilizing biometric authorization and digital certificate security is disclosed. The system uses a portable client PDA with touch screen, microphone, and CPU for processing voice commands, and processing biometric data to verify a user. In fact, the system requires the use of a PDA in which the user stores his financial and personal information. A digital certificate is downloaded from a central server of a service provider. The digital certificate accomplishes the goal of identification verification by checking whether the digital certificate is expired before providing any credit card information. This system is intended for managing financial data. The foregoing system requires use of shared secret keys between the user and the verifier. It also requires time-dependent synchronization for user verification purposes.

Another prior art system discloses a token issuing system, a mobile communication means, a token verification system and tokens. A user of the mobile communication means can use this system by ordering a certain token from the token issuing system, which produces a token and transmits the token to the mobile communication means. The user of the mobile communication means can then later use the token by effecting the transfer of the token to the token verification system, which receives and processes the token, and allows the user to obtain the benefit, right, or product associated with the token. In one embodiment, the user of the mobile communication means types the token on a keypad of the verifying system. The verifying system can include a scanning or image capture device for reading information on a display of the mobile communication means. The verifying system can comprise a digital camera for obtaining images. In another embodiment, the mobile communication means displays the token as a bar code on a display of the mobile communication means. The verifying system uses a shared key to decrypt the encoded string received from the mobile communication means.

Another prior art system discloses an authentication and verification method and apparatus employing tokens. The token, which can be a credit-card sized clip or carried as part of a key chain, works in conjunction with hardware or software running on a supplier's server system to generate a new, unpredictable code every 60 seconds that is known to the supplier server. For instance, each user may receive a personal token having a hidden 6-digit numerical string. The user further selects a 4-digit personal identification number (PIN) that is appended to the hidden numerical string in the token. The user's password is therefore the combination of the 4-digit PIN plus the hidden 6-digit numerical string. The 6-digit numerical string in the token automatically changes every 60 seconds. A security server compares the user-entered password with its knowledge of what password should have been entered for that 60-second period. The foregoing system requires time-dependent synchronization. Further, the passwords change every 60 seconds.

Hence, it would be desirable to provide methods and devices that are capable of providing secure transactions in a more efficient manner.

SUMMARY

Systems for providing secure document distribution are disclosed. In one embodiment, the system includes an application configured to: allow an author to create a document, allow the author to secure the document using an access code, wherein the access code is needed to gain access to the document, generate an image, the image having information embedded therein, the embedded information including information relating to the access code encoded in an encrypted format, and forward a message to a recipient. The message includes the document and the image. The system further includes a terminal configured to allow the recipient to open the message and a portable device configured to: allow the recipient to capture the image, store predetermined information, wherein the predetermined information is usable to decrypt the access code embedded in the image, capture input information from the recipient, the input information to be used to ensure that the recipient is authorized to use the portable device, and generate an output based on the information embedded in the image and the predetermined information, the output including the access code. The terminal is further configured to receive the output generated by the portable device and evaluate the output to determine if the recipient is allowed to access the document.

In another embodiment, the system includes an application configured to: allow an author to secure a document using an access code, wherein the access code is needed to gain access to the document, generate an image, the image having information embedded therein, the embedded information including information relating to the access code encoded in an encrypted format, create a message to a recipient, attach the document and the image to the message, and forward the message to the recipient. The system further includes a terminal configured to allow the recipient to open the message, and a portable device configured to: allow the recipient to capture the image, store predetermined information, wherein the predetermined information is usable to decrypt the access code embedded in the image, capture input information from the recipient, the input information to be used to ensure that the recipient is authorized to use the portable device, and generate an output based on the information embedded in the image and the predetermined information, the output including the access code. The terminal is further configured to receive the output generated by the portable device and evaluate the output to determine if the recipient is allowed to access the document.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

The present invention may be used for a number of different purposes including, for example, authentication, authorization, secure document distribution and guarding against phishing attacks, as will be further described below.

The present invention may be used in both the offline and online environments and provide on-demand input capability.

Figure 1:
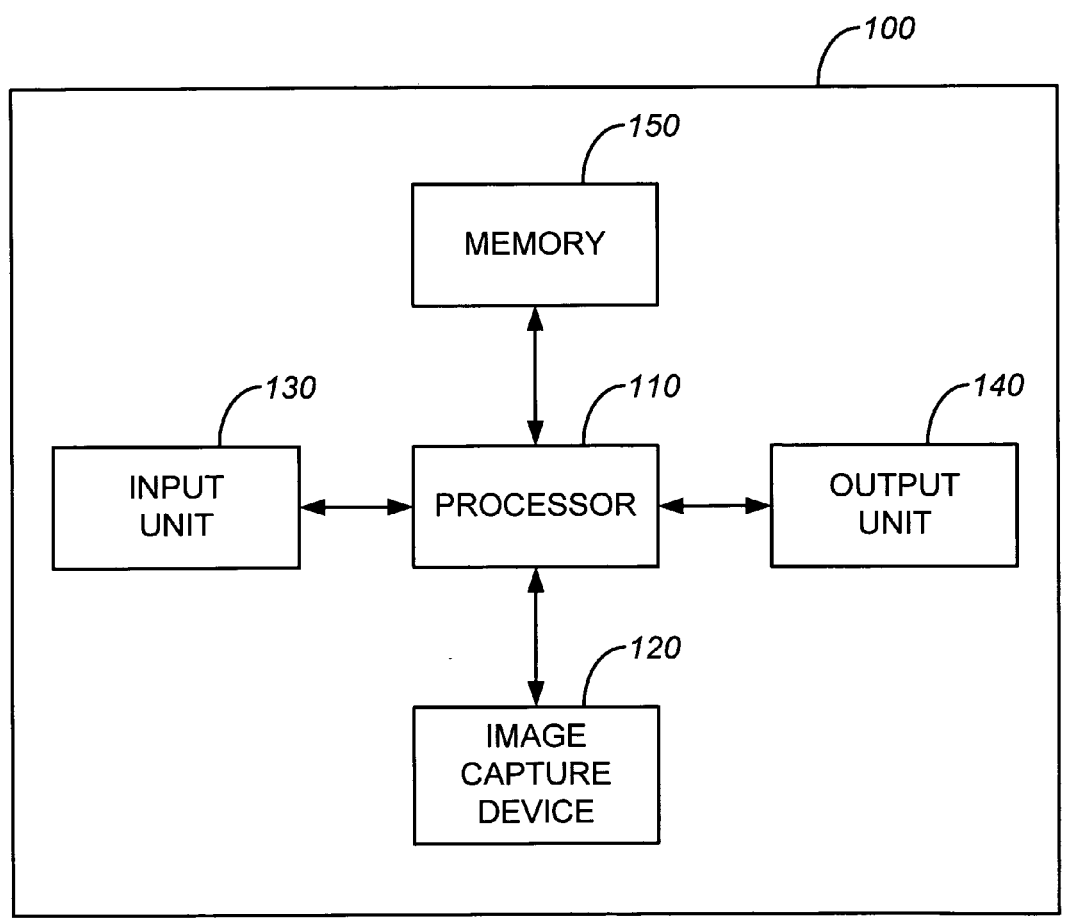
FIG. 1 is a simplified schematic diagram illustrating a secure device according to one embodiment of the present invention.

One or more embodiments of the present invention will now be described. FIG. 1 illustrates one secure device 100 according to one embodiment of the present invention. The secure device 100 may include a processor 110, an image capture device or circuit 120, an input unit 130, an output unit 140 and a memory 150. The secure device 100 may be incorporated as part of a token, card, badge, key fob, personal digital assistant (PDA), and cellphone, etc.

The processor 110 may include control logic configured to control operations of the secure device 100 including, for example, managing decryption and encryption functions. In some embodiments, the processor 110 may be implemented in the form of a smartcard. The smartcard may include a ciphering unit and a secure memory for storing, public keys, private keys and/or shared keys.

The image capture circuit 120 may include a digital camera or other types of image capturing devices. The image capture circuit 120 is used to capture image and/or video information. The captured image and/or video information may include a barcode including an one-dimensional barcode, such as a linear barcode, or a multi-dimensional barcode, such as a 2D barcode, multiple barcodes in a single image or multiple barcodes in multiple images where multiple images form a stream of images or a video. As will be further described below, the captured image and/or video information is used and processed for a number of different purposes.

The input device 130 may include a keypad, a touch sensitive screen, a biometric input unit or other types of devices that are capable of allowing a user to provide input information. The biometric input unit may include at least one of a fingerprint recognition module and a facial recognition module. As will be further described below, the input information may be used for identification purposes to allow the secure device 100 to be activated by the user, as well as other purposes.

The output unit 140 may include a LCD (Liquid Crystal Display). The display 140 is used to display information to a user of the secure device 100.

The memory 150 may include any type of storage devices that can be used to store information.

Figure 2:
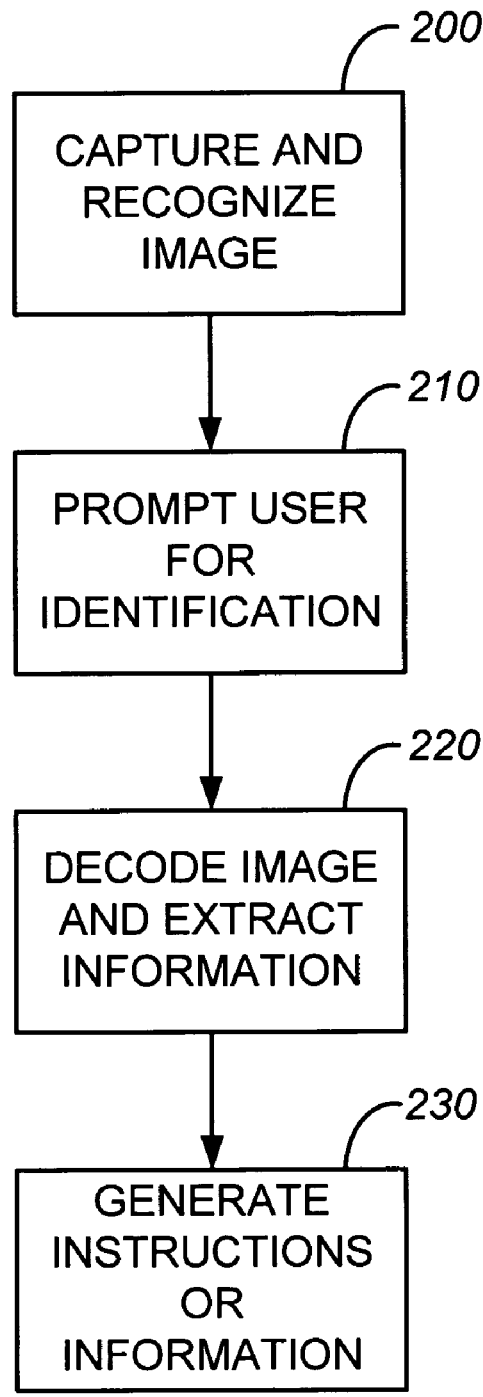
FIG. 2 is a flow diagram illustrating general operations of the secure device according to one embodiment of the present invention.

The secure device 100 generally operates in the following manner, as shown in FIG. 2. At block 200, the secure device 100 via the image capture circuit 120 captures information on a still or moving image or a stream of images. The stream of images may constitute a video. The image or video may include, for example, a linear or 2D barcode. Multiple barcodes may be embedded in the same image, or alternatively, multiple barcodes may be transmitted in multiple frames or images. The image or stream of images contain embedded information that is relevant to the transaction to be conducted. The information embedded in the image or stream of images may be created using any one of a number of well-known decryption/encryption algorithms, such as, a symmetric system using shared keys an asymmetric system using public/private key pairs. For example, the information embedded in an image may be encrypted using a public key or signed by a private key. Based on the disclosure and teachings provided herein, a person of ordinary skill in the art will know how to select the appropriate decryption/encryption algorithm for use according to the present invention.

At block 210, the secure device 100 also prompts a user to provide identification information via the input unit 130. The identification information may include a personal identification number (PIN), a password, and/or biometric information. The identification information is used to identify the user to ensure that the user is authorized to use the secure device 100.

At block 220, the secure device 100 via the processor 110 decodes the captured image or video and extracts the relevant embedded information. The processor 110 has knowledge of the encryption algorithm that is used to create the image and thus is able to use the corresponding decryption algorithm to decode the captured image. The decryption algorithm may use one or more input parameters for decoding. For example, if the image is created using a public key, the corresponding private key (as well as other information, such as, predetermined information stored in the memory 150 and the input information provided by the user) may be used to decrypt or decode the captured image. The predetermined information may include, for example, address information, personal profile information and payment account information. The secure device 100 also checks the identification information provided by the user to verify or authenticate the user's identity. The identification information provided by the user is checked against information previously supplied by the user during registration.

At block 230, upon successful verification of the user's identity and decoding of the captured image, the secure device 100 generates the appropriate instructions or information for the user. The instructions or information may then be provided via the output unit 140 for further action by the user. The user may act on the instructions or information in a number of ways. For example, the instructions or information may be transmitted in the form of a radio or sonic signal. The transmitted signal may then be received by another party, such as, a merchant, seller, vendor or third-party service provider, for use in connection with various purposes, as will be further described below.

Figure 3:
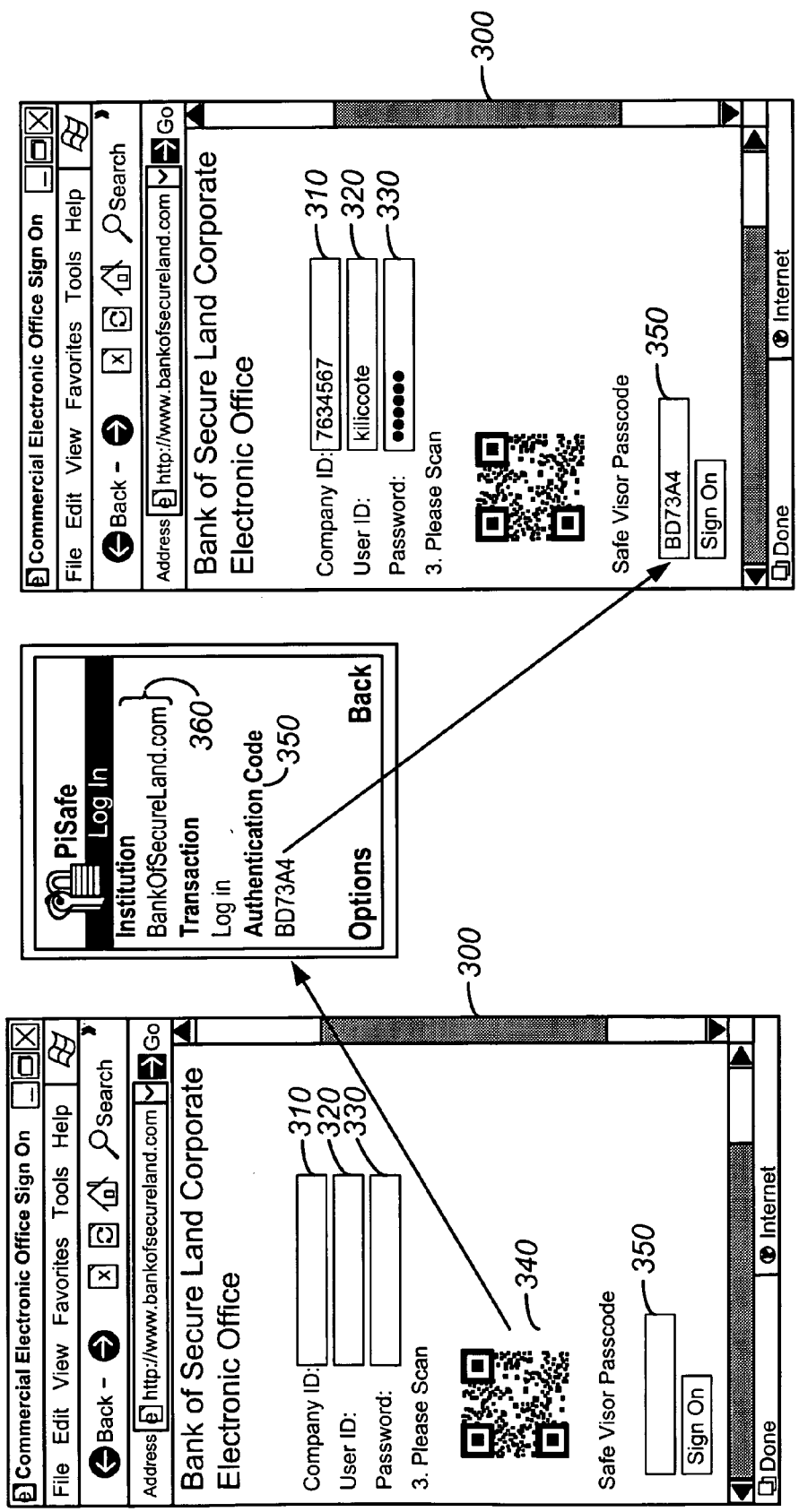
FIG. 3 is a simplified schematic diagram illustrating one authentication application of the secure device according to one embodiment of the present invention.

The secure device 100 can be deployed in a number of applications. In one illustrative application, the secure device 100 is used to effect authentication, as shown in FIG. 3. Authentication is needed for any system where the identity of a user has to be ascertained. As shown in FIG. 3, a user visits a website and is presented with a log-on screen 300. The user is required to enter certain correct information (such as, company ID 310, user ID 320 and password 330) before further access to the website is granted. In addition, the log-on screen 300 further displays an image or video 340. The image or video 340, such as a linear barcode, or multiple barcodes in moving images contain certain embedded information that will be used to derive the corresponding authentication code 350. The correct authentication code 350 has to be entered in order to allow the user to continue to access the website.

The user activates the secure device 100 and uses the secure device 100 to scan the image or video 340. As part of the activation process, the user may need to enter a password or other types of identification information into the secure device 100 to ensure that the user is authorized to use the secure device 100. The secure device 100 then derives the authentication code 350 and other relevant information 360 based on the embedded information stored in the scanned image or video 340 and, optionally, other types of information including, for example, predetermined information stored in the secure device 100 and identification information provided by the user. The derivation process may be performed using an encryption, a decryption or a message authentication algorithm. If the image 340 has been generated using an encryption or decryption algorithm, the derivation process may correspond to the encryption or decryption algorithm used to create the information embedded in the image or video 340. The authentication code 350 and other relevant information 360 are displayed on secure device 100 for viewing by the user. The user may then key in the authentication code 350 as well as other required information (such as, company ID 310, user ID 320 and password 330) to obtain further access to the website. Since the website initially provides the image or video 340, the website also has knowledge regarding the correct authentication code 350 corresponding to the information embedded in the image or video 340. The foregoing method may also be used to identify users or authenticate users to computer terminals, servers, and devices, etc.

If the output of the secure device 100 is transmitted in the form of a radio or sonic signal, a corresponding reception device at a station (such as, a computer, terminal or server) receiving the transmitted signal may deem the user identified if the signal corresponds to an expected value at the station for a specific user and secure device 100 previously registered for that station.

The secure device 100 may also be used to identify or authenticate persons for physical access to structures and/or vehicles through entry points, such as, doors and gates. If the output of the secure device 100 is transmitted in the form of a radio or sonic signal, a station (e.g., a merchant, seller, vendor, third part service provider, guard) receiving the transmitted signal may deem the user identified if the signal corresponds to an expected value at the station for a specific user and secure device 100. If, on the other hand, the output is in the form of a visual display displayed on the secure device 100, the user can enter the displayed information on a keypad attached to the station. The user can also read the information to a machine or a person over the telephone at the station. The user can also write down the displayed information on paper for immediate or later processing. The display may display an image that can be captured with a camera at the station, thereby eliminating the need for user to enter, read or write down the information.

In the identification mode, the output from the secure device 100 received at a station may be compared to all the registered users and devices to identify the user and the secure device 100 that would generate the expected output. With suitable selection of the encryption protocols, the output can be rendered deterministically or probabilistically unique for each user and device combination.

The image or video captured by the secure device 100 may also include additional information, such as, information relating to a website, server, terminal, device, structure or vehicle which the user is gaining access to. The image or video captured by the secure device 100 may further include a description of the action, such as, login to a server or terminal or access to a structure. In addition, the image or video captured by the secure device 100 may include a unique number, nonce, a transaction number or a random number, a number that the secure device 100 will use to derive the authentication code. Furthermore, the image or video captured by the device may include a digital signature generated by a trusted party.

The authentication process can also be accomplished in two steps to improve the security. The user may provide his or her information such as company ID, user ID, and a password in the first step of the authentication. The terminal, server, or website receiving the information may generate an image in the second step of the authentication process. The image generated in the second step of the authentication process may contain information specific for the user. Such information may include the identity of the user as established by the first step and a piece of information that can be used to prevent replay attacks. The piece of information that can be used to prevent replay attacks include, for example, time of the last login, a sequence number assigned at the last authentication process, or a sequence number greater than a number embedded in the image at the last authentication process. Furthermore, such information may be digitally signed to prevent other parties from generating such information. The secure device 100 can be used to capture such information and the secure device 100 may verify the validity of such information by verifying the signature and the piece of information added to prevent replay attacks. For example, the secure device 100 may verify that the sequence number used by the site is larger than the last sequence number that the secure device 100 has captured.

The speed of the authentication process can be increased by establishing a secret key shared by the secure device 100 and the website, server or terminal requiring authentication. Such shared secret key can be selected by the website, server or terminal requiring authentication and sent to the secure device 100 through the images that embed such information. The shared secret key may be encrypted by the public key of the secure device 100 and signed by the private key of the website, server or terminal requiring authentication. The secure device 100, upon receiving the information related to the shared secret key, may confirm the validity by verifying the digital signature associated with the information. Upon verification, the secure device 100 may store the shared secret key in a secure fashion. Any interaction with the website, server or terminal requiring authentication can use the shared secret key to create shorter signatures. Furthermore, such signatures can be created and verified faster than the digital signatures created using asymmetric encryption algorithms.

Figure 4:
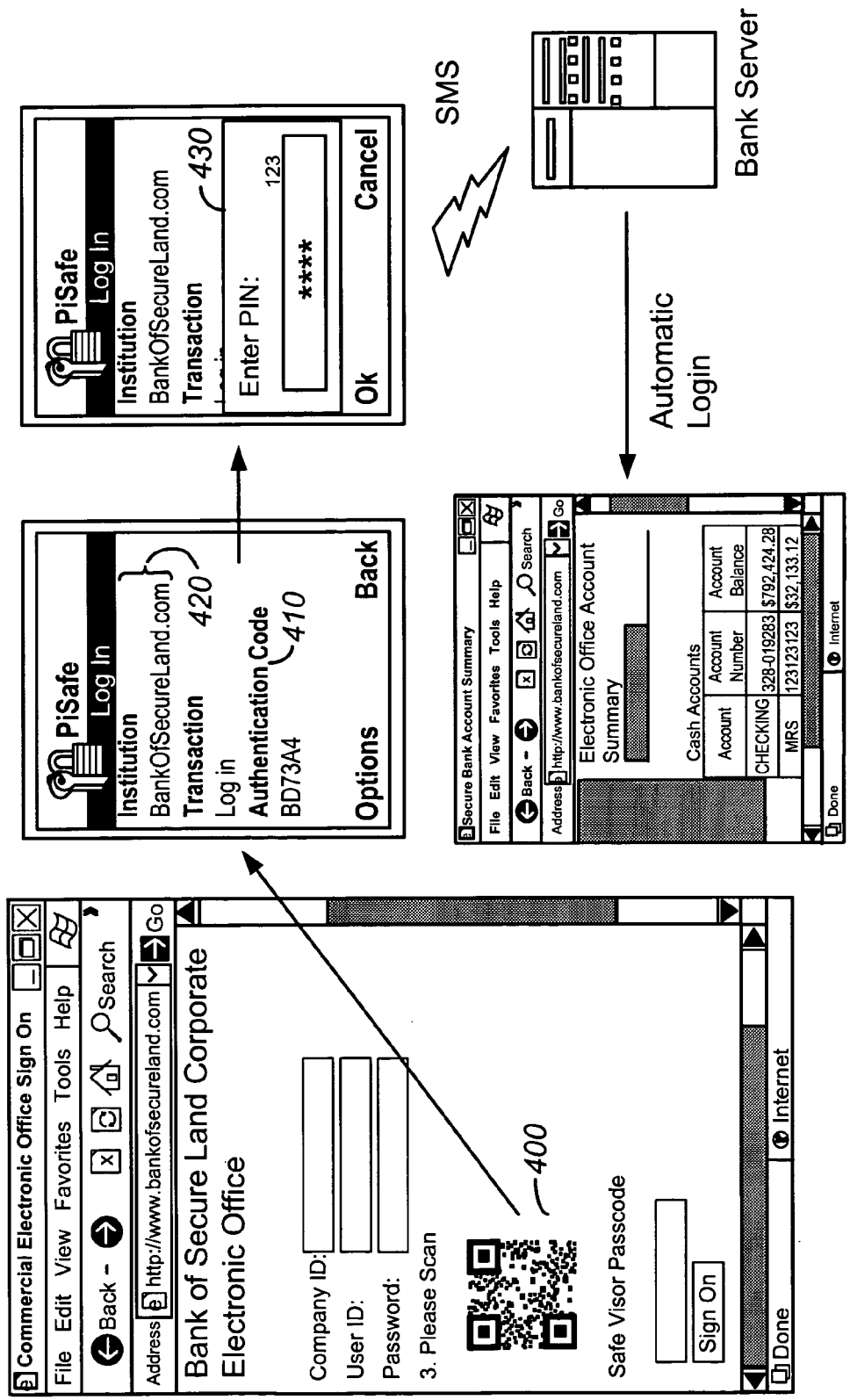
FIG. 4 is a simplified schematic diagram illustrating another authentication application of the secure device according to one embodiment of the present invention.

In another illustrative application, the secure device 100 can be used to effect authentication in an alternative manner, as shown in FIG. 4. Similarly, the user uses the secure device 100 to derive the authentication code 410 and other relevant information 420 from the scanned image or video 400. The secure device 100 then further prompts the user to enter his/her personal identification number (PIN) 430 and/or other identification information. The PIN 430 and/or identification information may then be forwarded by the secure device 100 in the form of a message to the website server 440 via, for example, a wide area network (such as, a cellular or wireless network), SMS (Short Message Service), EMS (Extended Message Service), or other types of message delivery services or protocols. The message may include identity of the user and secure device 100, a unique value generated by the secure device 100, and a unique number, nonce, a transaction number or a random number embedded in the image. The message might be digitally signed and encrypted to protect and prove the identity of the user and the secure device 100 and also to prevent eavesdropping. If a shared secret key has been established previously, the shared secret key can also be used to increase the speed of the encryption and signature generation and shorten the message length.

The server 440, by using the unique number, the nonce, the transaction number or the random number transmitted with the message, may identify the session that the user is using to authenticate his or her identity and may then deem the session as authenticated, thereby allowing the user to conduct any desired transactions on the website. In one embodiment, the secure device 100 may be implemented as part of a cell phone or a personal digital assistant.

Figure 5:
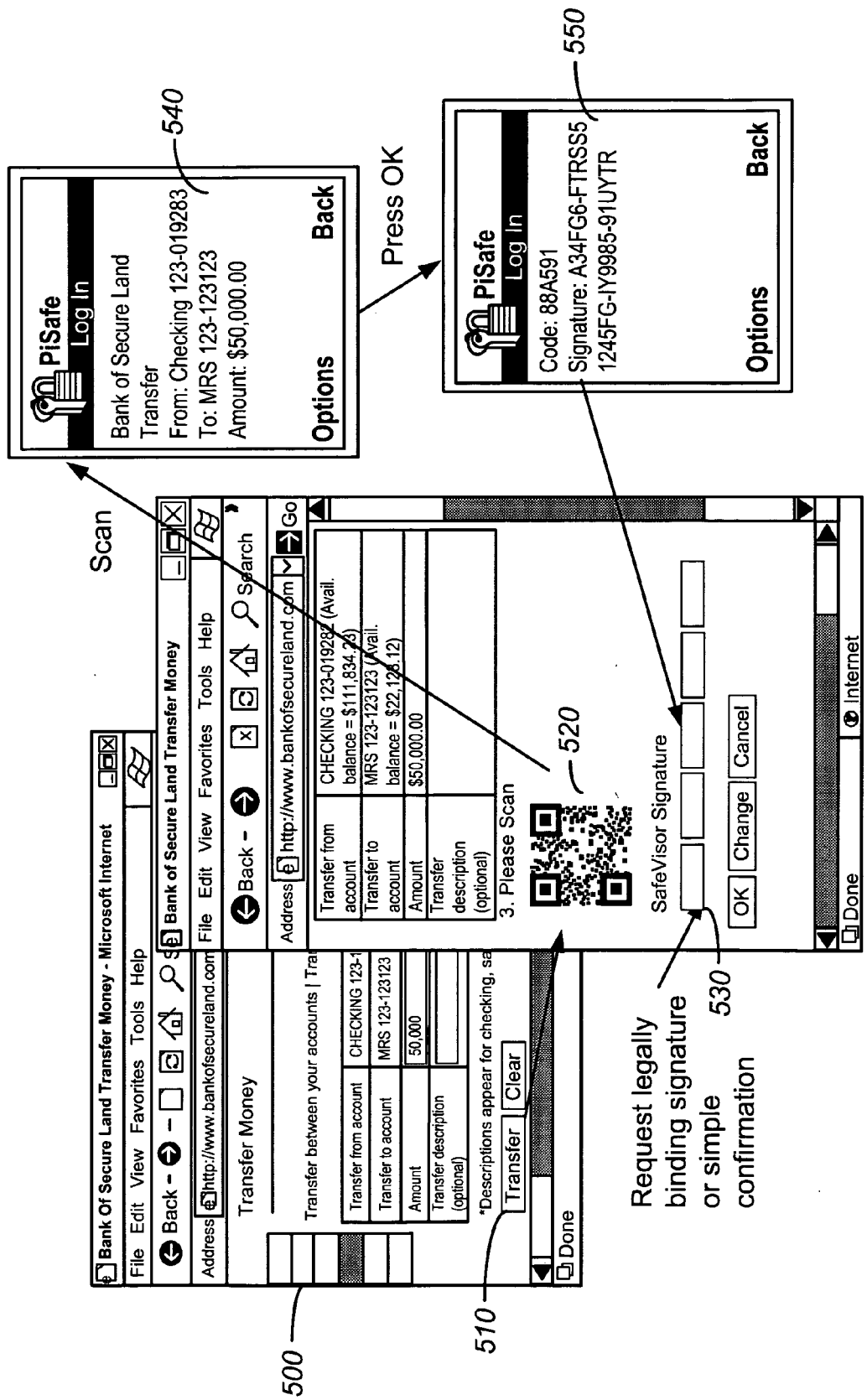
FIG. 5 is a simplified schematic diagram illustrating one authorization application of the secure device according to one embodiment of the present invention.

In another illustrative application, the secure device 100 can be used to effect authorization, as shown in FIG. 5. Initially, the user may be authenticated for permission to enter a website, terminal, server or device using the secure device 100 as described above or through other mechanisms. It is also possible that no prior authentication took place. After the user successfully logs in to the website, terminal, server or device, the user may perform a desired transaction, such as, transferring money between accounts. Such desired transaction may need to be further authorized to provide additional security. For example, as shown in FIG. 5, the user may complete a form 500 to effect transfer of money between accounts. Upon hitting the "transfer" button 510, the website, terminal, server or device displays an image or stream of images 520 and a blank designated entry 530 for a confirmation signature. The image or stream of images 520 include embedded information relating to the transfer transaction and possibly a unique transaction number. The embedded information might be encrypted and digitally signed for authentication purposes to prevent eavesdropping. The correct confirmation signature has to be provided in order to effect the transfer. The correct confirmation signature can be derived from the information embedded in the image or stream of images 520 using the secure device 100. More specifically, the user may use the secure device 100 to scan the image or stream of images 520. The secure device 100 may then decode the scanned image or stream of images 520 and derive the embedded information. The derived information relating to the transfer transaction may then be shown on a display 540 by the secure device 100 for viewing by the user. The user may then verify the information. The user may optionally be asked to enter his or her personal identification number for authentication.

Upon completion of the authentication process, the secure device 100 may generate the corresponding confirmation signature 550. The confirmation signature may be a digital signature generated based on embedded information contained in the image or stream of images 520 and, optionally, other types of information, such as, an identification code that uniquely identifies the user and the secure device 100. If a shared secret key has been established beforehand, the generated confirmation signature may also be an authorization code derived from the identity of the user and secure device 100, the transaction information and the shared secret key. The user may then input the generated confirmation signature or authorization code into the designated entry 530. The website, terminal, server or device may then check the generated confirmation signature or authorization code relative to the information embedded in the image or stream of images 520. If the generated confirmation signature is correct for a specific user and/or secure device 100, the transfer transaction will be completed. Furthermore, the generated confirmation signature may be used as undisputed proof that the user has authorized the transfer transaction, thereby preventing the user from denying having performed the transaction.

Figure 6:
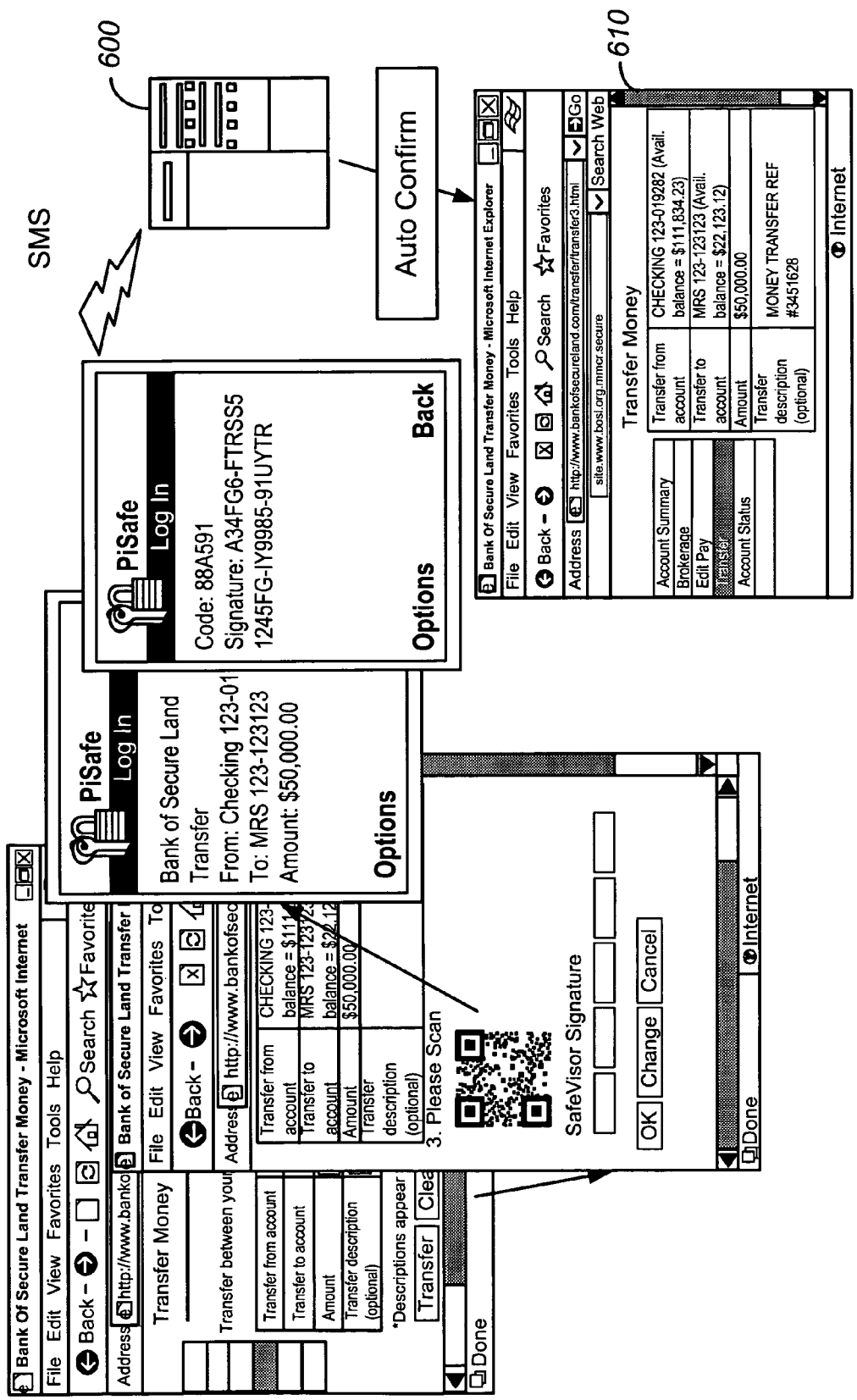
FIG. 6 is a simplified schematic diagram illustrating another authorization application of the secure device according to one embodiment of the present invention.

In a similar illustrative application, the secure device 100 can be used to effect authorization in an alternative manner, as shown in FIG. 6. The authorization process is similar to that described in connection with FIG. 5 above. Alternatively, upon the secure device 100 generating the confirmation signature or authorization code, the secure device 100 may transmit the generated confirmation signature or authorization code to a transaction server 600 handling the transaction. The generated confirmation signature or authorization code may be transmitted in the form of a message in a number of ways including, for example, a wide area network (such as, a cellular or wireless network), email, SMS and EMS. The message may also include the unique transaction number embedded in the image or stream of images. In response, upon receiving the generated confirmation signature or authorization code, the transaction server 600 may then use the transaction number to identify the session and check the generated confirmation signature or authorization code relative to the information embedded in the image or stream of images and, if appropriate, effect the transaction and display the confirmation information 610 to the user.

Authorization involving multiple parties, such as credit and debit card transactions, can also be achieved. For example, the authorization can be achieved by embedding values derived from the transaction with secret information shared by the user of the secure device 100 and the other parties. The secrets shared by the user of the secure device 100 and the other parties can be credit card numbers, the expiration date of the card, the registered address of the user, and a password established by the user. The other parties can be merchants, banks, credit card issuers, and service providers that may need to be involved with the transaction. A party receiving a user response can forward the response to any of the other parties for verification purposes. Such authorization may be used in connection with an online e-commerce transaction, as will be further described below.

Figure 7:
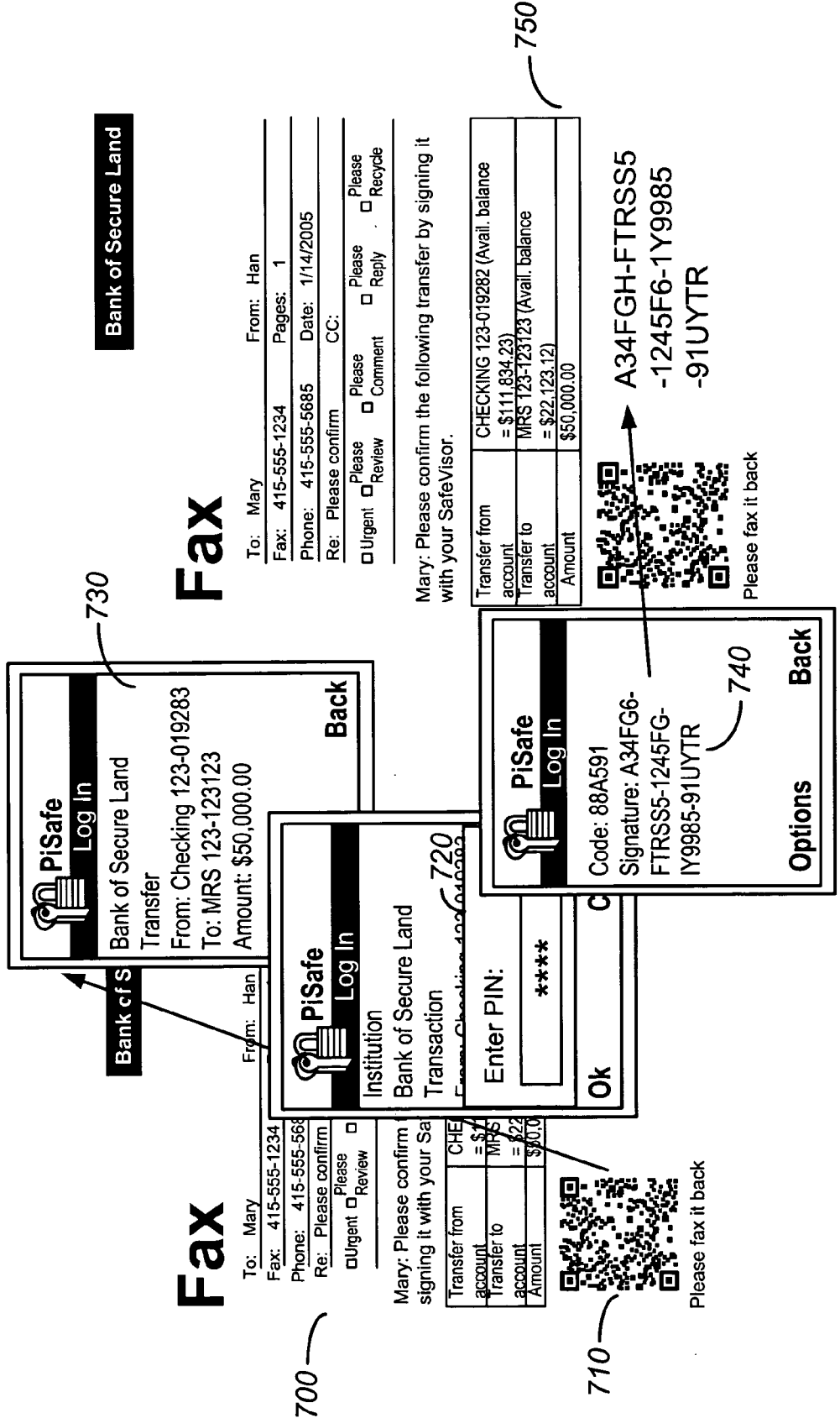
FIG. 7 is a simplified schematic diagram illustrating one digital signature application of the secure device according to one embodiment of the present invention.

In another illustrative application, the secure device 100 can be used to provide offline digital signature to effect authorization, as shown in FIG. 7. A sender seeking authorization for a transaction forwards a printed form 700 to a user. The printed form 700 includes certain transaction information as well as an image 710, such as a barcode, or a set of images, such as a set of barcodes. The image 710 includes embedded information relating to the transaction. The user using the secure device 100 scans the image 710. The secure device 100 may then prompt the user to enter his/her personal identification number (PIN) 720 for authentication purposes. Once the correct PIN 720 is entered, the secure device 100 decodes the scanned image 710 and derives the embedded transaction information. The transaction information is then shown via a display 730 on the secure device 100 to the user. The user may then provide approval of the transaction by entering the corresponding command into the secure device 100. The secure device 100 may then generate the corresponding confirmation signature or authorization code 740 based on the information embedded in the image 710 and optionally the PIN 720 of the user and display the generated confirmation signature or authorization code 740 to the user. In response, the user may then provide the generated confirmation signature or authorization code 740 to the sender to confirm authorization via, for example, a telephone, a wide area network (such as, a cellular or wireless network), an email, SMS message, EMS message or facsimile 750. Since the sender initially provides the image 710, the sender also has knowledge with respect to the corresponding confirmation signature or authorization code. As a result, by receiving the generated confirmation signature or authorization code 740 from the user, the sender may verify whether the user is authorized to provide approval for the transaction.

Figure 8:
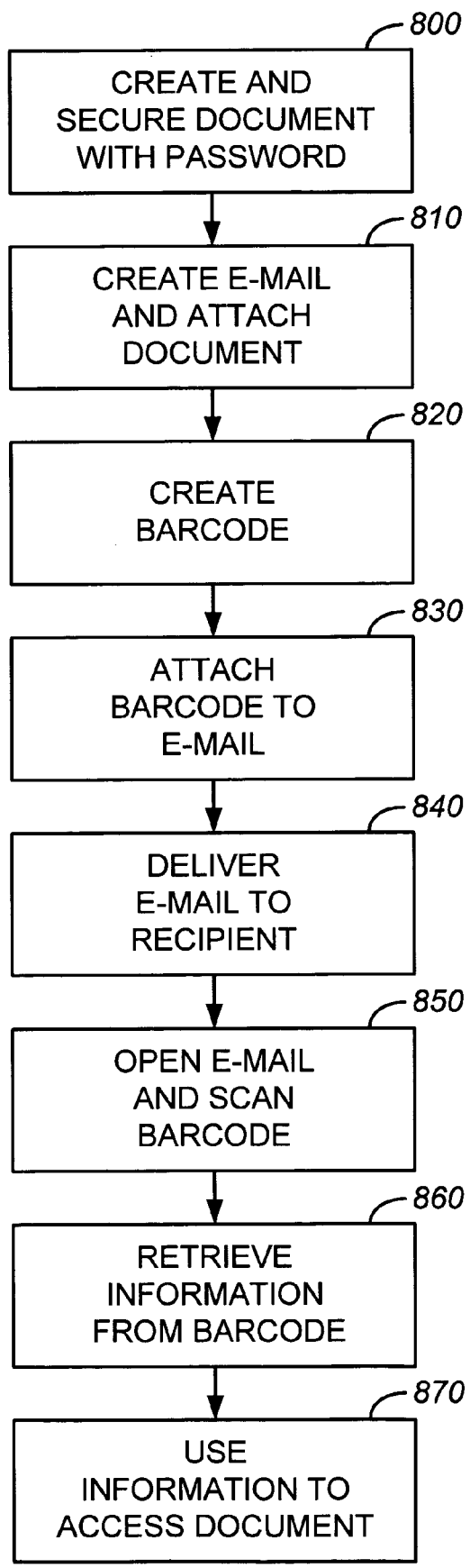
FIG. 8 is a flow diagram illustrating general operations of a document distribution application using the secure device according to one embodiment of the present invention.

In another illustrative application, the secure device 100 can be used to provide secure document distribution. FIG. 8 illustrates the logic flow with respect to using the secure device 100 to provide secure document distribution. At block 800, a document is created and secured using a password. The password can be viewed as the correct answer to a challenge. The challenge is presented to someone who attempts to access the secured document. At block 810, a message, such as an email, instant message (IM), SMS or EMS message, is created for a recipient with the secured document being included as an attachment. At block 820, an image or a stream of images is created. The image or stream of images includes embedded information relating to the password used to secure the document. The information embedded in the image or stream of images can be created using public keys that are stored locally or centrally managed. In one implementation, creation of the image or stream of images may be automated. For example, using the Microsoft Office application, a plug-in can be added to allow the image or stream of images containing the password to be inserted automatically into a message, such as an email; alternatively, the image or stream of images may also be created for S/MIME compatibility on an automated basis by generating a one-time certificate and attaching the certificate to the image or stream of images or encrypting the certificate with a randomly generated password, storing the certificate at a server and providing the password and the location of the certificate to the user through the image or stream of images.

At block 830, the image or stream of images is also included as part of the message. At block 840, the message including the secured document and the image or stream of images is delivered to the recipient. At block 850, upon opening the message, the recipient may use the secure device 100 to scan the image or stream of images. At block 860, upon retrieving the images or stream of images, the secure device 100 may then derive the embedded information from the images or stream of images including information relating to the password. Such information is then displayed to the user. At block 870, the user uses such information to access the secured document. For example, a challenge may be presented to the user when the user attempts to access the secured document. Upon providing the password, the challenge is satisfied and the secured document can be accessed by the user.

In an alternative embodiment, the secure device 100 can be used to provide secure document distribution as follows. An application may be used by an author to create a document. The application further allows the author to secure the document using an access code. The access code is needed to gain access to the document. The application then secures or encrypts the access code in such a way that only the secure device 100 is able to decrypt the encrypted access code. The application then further allows the author to create a message for a recipient. The message includes both the document and the encrypted access code.

The message is then forwarded by the application to a terminal for retrieval by the recipient. The terminal allows the recipient to open the message. The terminal then generates an image or a stream of images. The image or stream of images includes embedded information relating to the secured access code. The image or stream of images is then displayed to the recipient. The recipient using the secure device 100 may then capture the image or stream of images. The secure device 100 may be used to extract the embedded information in the image or stream of images and decrypt the secured access code. The access code may then be displayed to the recipient who, in turn, may provide the access code to the terminal. Upon the terminal confirming that the access code is correct, the recipient is given access to the document.

In another alternative embodiment, the terminal not only allows the recipient to open the message but also generates a passcode. The passcode may be generated in a random manner. The passcode is secured or encrypted in such a way that only the secure device 100 is able to decrypt the secured passcode. The terminal further generates an image or a stream of images. The image or stream of images includes embedded information relating to the secured access code and the secured passcode. The image or stream of images is then displayed to the recipient.

The recipient may use the secure device 100 to capture the image or stream of images. The secure device 100 may then decode the image or stream of images and extract the embedded information. The embedded information is then used by the secure device 100 to derive the access code and the passcode. Once the access code and the passcode are derived, the secure device 100 may secure or encrypt the access code using the passcode. The newly encrypted access code is then forwarded to the terminal.

Once the terminal receives the encrypted access code from the secure device 100, the terminal may then decrypt the encrypted access code to derive the access code. Since the passcode used to encrypt the encrypted access code is originally generated by the terminal, the terminal should be able to decrypt the encrypted access code and recover the access code. Once the access code is recovered, the terminal may then use it to access or recover the document. It should be noted that using the foregoing approach, the access code is not revealed to the recipient. As a result, the document cannot be re-distributed and accessed without the secure device 100.

It can be seen that the secure device 100 provides a number of benefits with respect to secure document distribution. For example, the secure device 100 enables secure document distribution without incurring any additional software resources on the recipient. Furthermore, the recipient does not have to manage any digital certificates, nor does the recipient have to install any drivers for hardware tokens. Finally, the recipient may use distrusted terminals to retrieve secured documents.

In a similar illustrative application, the secure device 100 can be used to effect digital rights management. The document may contain an access control list to limit the users to certain operations. For example, only certain users might be allowed to open, modify, change, copy and/or print the information embedded in a document or media, such as, music or video. Furthermore, the digital certificates of the users might be embedded in the document or media directly. When a user tries to open, modify, change, print and/or copy the document or media through a program, the program might generate a challenge for a specific user dynamically. The challenge might be embedded in an image or stream of images which, for example, contain barcodes. In response to the challenge, the user scans the image or stream of images using the secure device 100. The user might be optionally asked to provide a password to either the secure device 100 or the program. The secure device 100 might use the private key of the certificate associated with the user or secure device 100 to generate an authentication code in response to the challenge. The user may then provide the authentication code by entering it manually on a terminal. The secure device 100 might also generate radio or sonic signals that might be captured by the terminal. The secure device 100 might also send a message, such as email, SMS or EMS message, to a server to provide the authentication code. The program upon receiving the authentication code confirms the identity of the user by comparing the response received. If the identity of the user is confirmed and the operation that the user is trying to accomplish is allowed, the program performs the operation.

Figure 9:
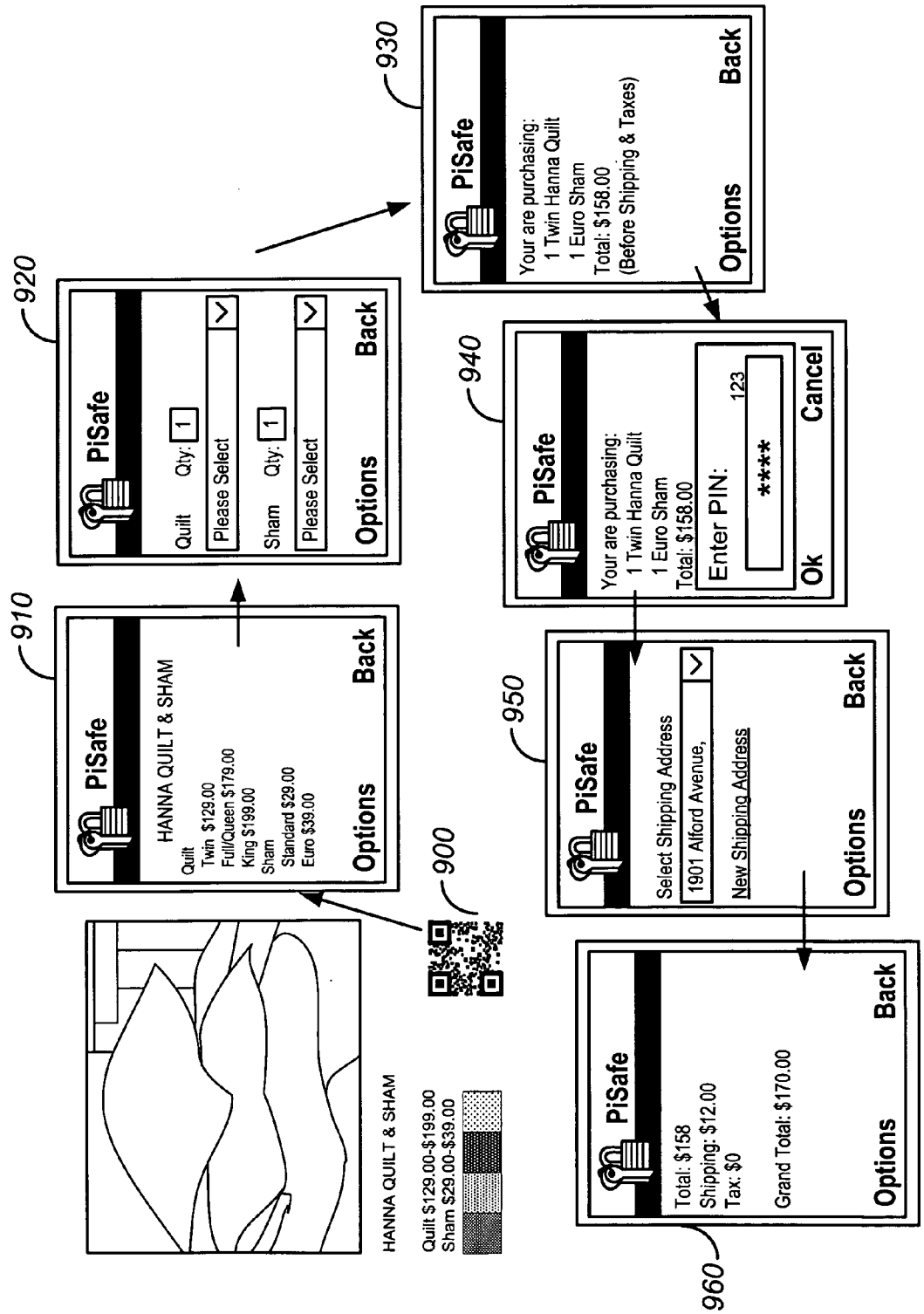
FIG. 9 is a simplified schematic diagram illustrating one online e-commerce application of the secure device according to one embodiment of the present invention.
Figure 9:
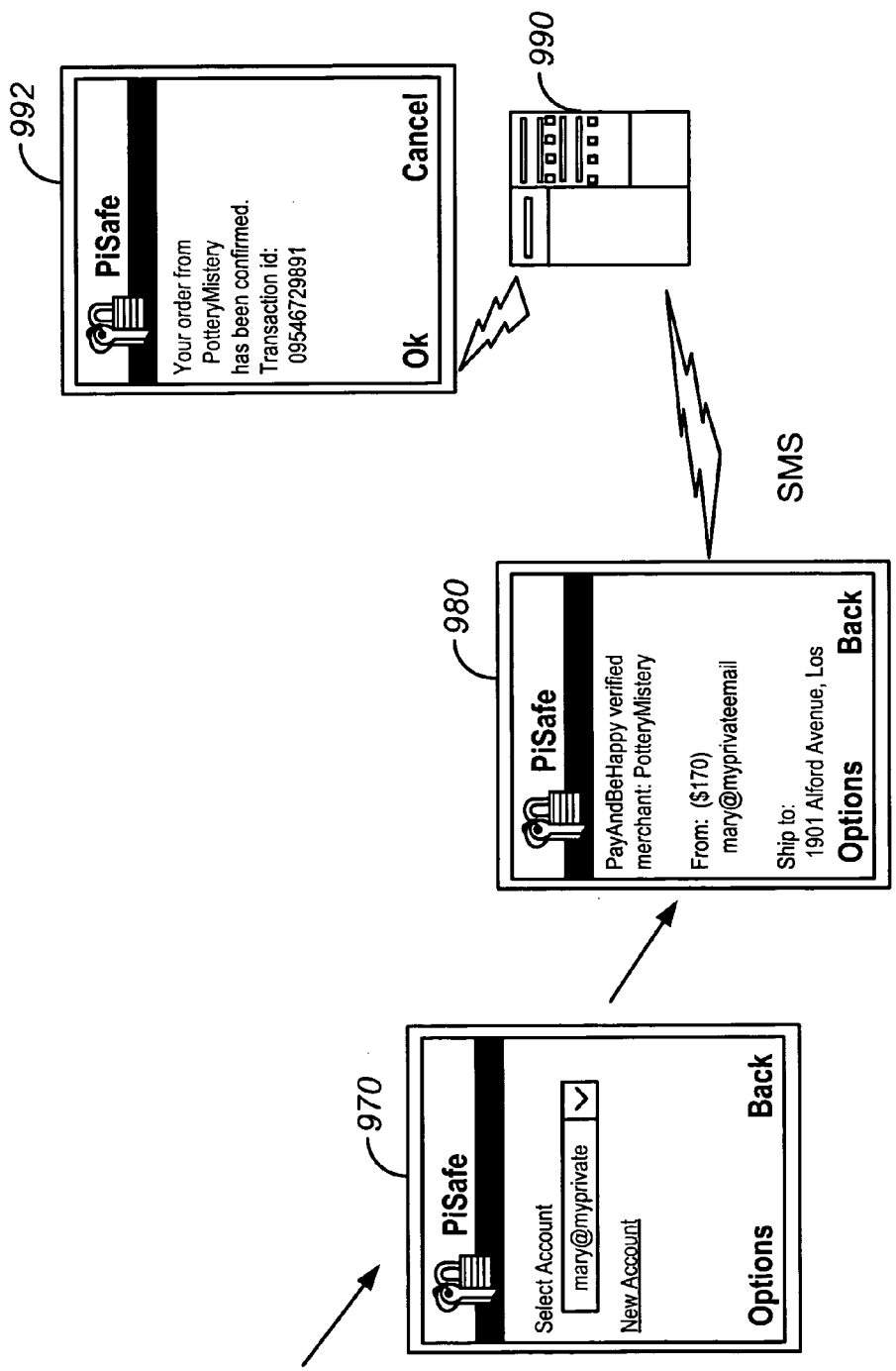

In a further illustrative application, the secure device 100 can be used to conduct transactions using images displayed on printed materials, such as books, signs, and catalogs, or transmitted to computers or television screens, as shown in FIG. 9. An image 900 or stream of images can be displayed on a catalog, book or sign. The image 900 or stream of images may also be shown on a television or computer screen. The image 900 or stream of images may include embedded information relating to a particular product or service (such as, product or service description and transaction identification), information related to a merchant providing the product or service, a public key assigned to the merchant, a digital signature of the public key, a digital signature for the transaction, the Internet address of the merchant, etc. Using the secure device 100, a user may scan the image 900 or stream of images. The secure device 100 may then derive the relevant information relating to the product or service and display such information to the user as shown in block 910. The secure device 100 may further allow the user to conduct a transaction as shown in blocks 920–960. For example, as shown in block 920, the user may use the secure device 100 to enter selection and purchase information. Upon receiving the selection and purchase information, the secure device 100 may then display the summarized transaction information to the user, as shown in block 930. If the user agrees with the summarized transaction information, the user may then authorize the transaction. As shown in block 940, the secure device 100 may require the user to provide a PIN to ensure that the user is authorized to order the transaction. Upon verifying the PIN provided by the user, the secure device 100 may then proceed with the transaction, for example, by allowing the user to select a shipping address and displaying the final transaction information to the user, as shown in block 950–960. In addition, the secure device 100 may also allow the user to designate how the transaction is to be paid for, as shown in blocks 970–980. The secure device 100 may then forward the relevant transactional information to a server associated with the merchant for further processing, as shown in block 990. Such information may be forwarded to the merchant using a number of different methods including, for example, a wide area network (such as, a cellular or wireless network), SMS, EMS or other types of message delivery services. The information may be encrypted. In addition, the secure device 100 may also forward a digital signature or authorization code associated with the transaction and generated by the secure device 100 to the server. The digital signature or authorization code may be used to prove that the transaction was legitimately ordered by the secure device 100. Upon the server completing the transaction, confirmation information can be sent by the merchant to the secure device 100 for viewing by the user, as shown in block 992.

Alternatively, the transaction can be handled via a third party service provider. The image or stream of images can be generated by the third party service provider. In this case, the public key and the server address of the third party service provider can be embedded in the secure device 100. The server of the third party service provider can conduct the transaction on behalf of the user of the secure device 100. The secure device 100 upon deciphering the image or stream of images can send a confirmation to the third party service provider through, for example, a wide area network (such as, a cellular or wireless network). The third party service provider can then cooperate with the server associated with the merchant to complete the transaction including, for example, transferring the information required to complete the transaction, such as payment and shipping information, to the server associated with the merchant. The third party service provider may also bill the user of the secure device 100 directly for the transaction amount.

In the situation where there is no communication channel between the secure device 100 and the third party service provider or the merchant, the secure device 100 and the third party service provider or merchant can utilize a shared secret key and identification information assigned to the secure device 100 or to the user of the secure device 100. The shared secret key and the identification information are previously provided to the secure device 100 and the service provider. The secure device 100 can capture the image or stream of images and decode its embedded information. The secure device 100 can then combine the decoded information and the identification information and encode the combination using the shared secret key. The encoded value, including a portion of the identification information, can be displayed on the secure device 100. The user may then provide the encoded value to the terminal, device, or website or may call the merchant or third party service provider to provide the encoded information. The third party service provider, upon receiving the encoded value, can send the information to the merchant for identification and verification purposes. The merchant, upon receiving the encoded value, can derive the identity of the user and verify that the secure device 100 has been in legitimate possession of the user.

Figure 10:
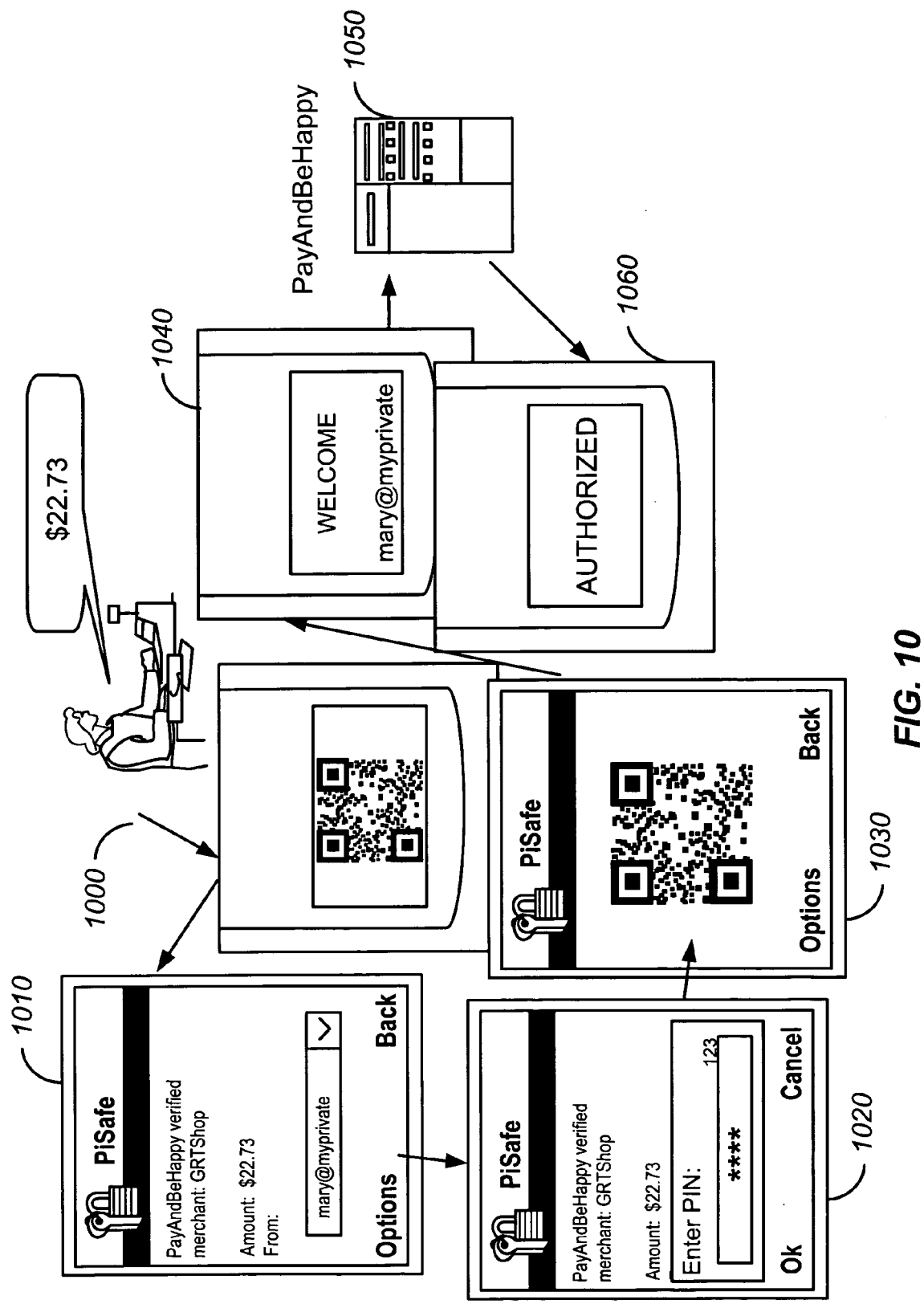
FIG. 10 is a simplified schematic diagram illustrating one check-out application of the secure device according to one embodiment of the present invention.

In another illustrative application, the secure device 100 can be used in a checkout process, as shown in FIG. 10. At block 1000, upon checkout, a register generates an image or a stream of images for a transaction. The image or stream of images includes embedded information relating to the transaction. The image or stream of images is presented to the user. The user then uses the secure device 100 to scan the image or stream of images. The secure device 100 then derives the relevant information relating to the transaction from the barcode and displays such information to the user, as shown in block 1010. The user may then authorize the transaction. The secure device 100 may further require the user to provide a PIN, as shown in block 1020, to ensure that the user is indeed authorized to approve the transaction. If the correct PIN is provided, the secure device 100 generates its own image or stream of images, as shown in block 1030. The image or stream of images generated by the secure device 100 may include relevant transaction and payment information including, for example, credit card or other payment account information. The image or stream of images is then provided to the register, as shown in block 1040. The register may include a scanning device capable of scanning the image or stream of images displayed on the secure device 100. Upon retrieving the image or stream of images from the secure device 100, the register may then derive the relevant information and use such information to contact a payment server to obtain payment for the transaction, as shown in block 1050. Depending on the information received from the register, the payment server may then provide the appropriate response to the register accordingly, as shown in block 1060.

Figure 11:
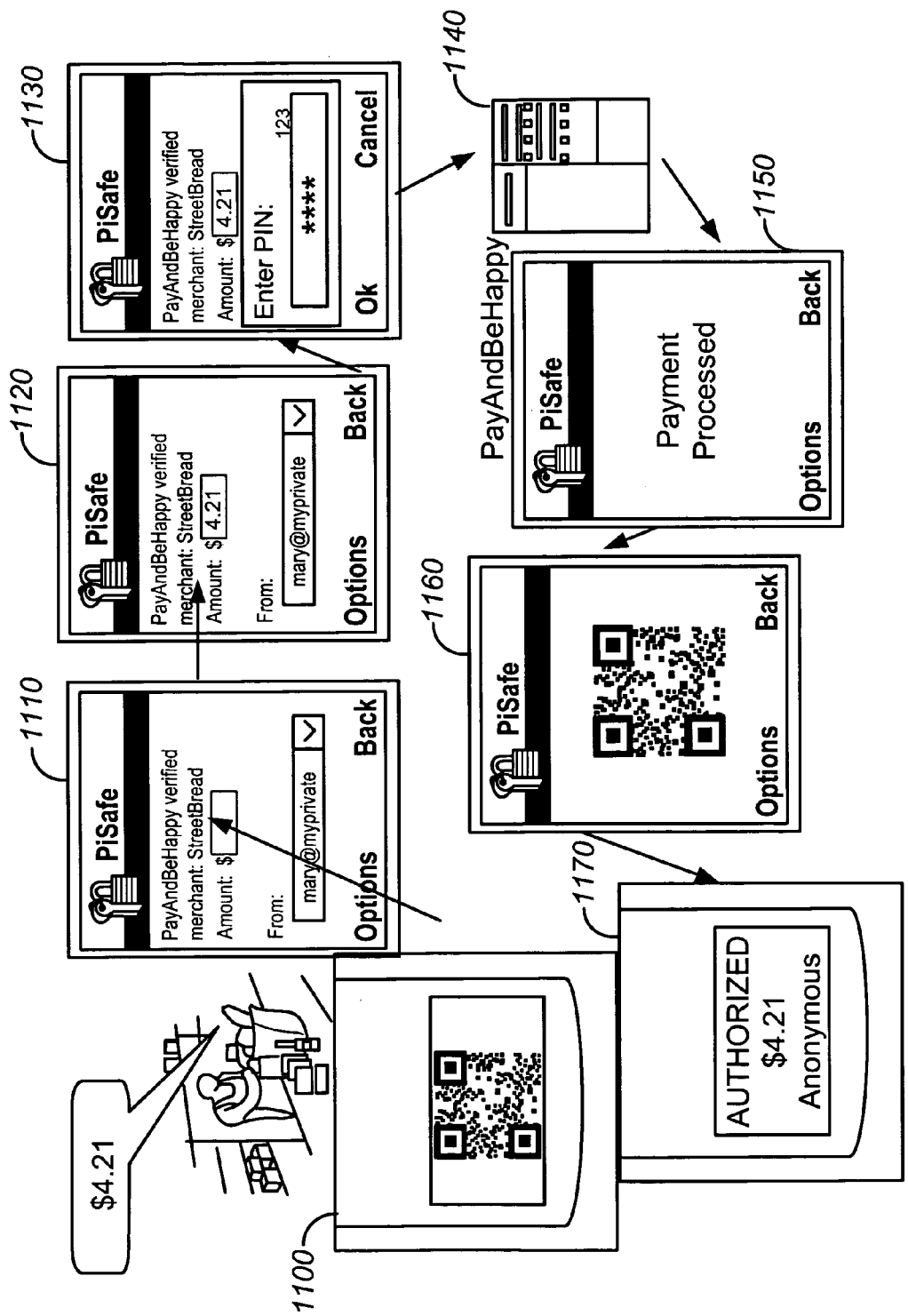
FIG. 11 is a simplified schematic diagram illustrating another check-out application of the secure device according to one embodiment of the present invention.

In a further illustrative application, the secure device 100 can be used in a checkout process in an alternative manner, as shown in FIG. 11. At block 1100, upon checkout, a register generates an image or a stream of images for a transaction. The image or stream of images includes embedded information relating to the transaction. The image or stream of images is presented to the user. The user then uses the secure device 100 to scan the image or stream of images.

The secure device 100 then derives the relevant information relating to the transaction from the image or stream of images and displays such information to the user, as shown in block 1110. The user may then further provide any additional information, such as, the transaction amount, and authorize the transaction, as shown in block 1120. The secure device 100 may further require the user to provide a PIN, as shown in block 1130, to ensure that the user is indeed authorized to order the transaction. If the correct PIN is provided, the secure device 100 may then contact a payment server to complete payment for the transaction, as shown in block 1140. Upon successfully completing payment for the transaction, the payment server may then forward the appropriate confirmation information to the secure device 100, as shown in block 1150. The confirmation information may be forwarded to the secure device 100 in a number of ways including, for example, a wide area network (such as, a cellular or wireless network), SMS, EMS and other types of message delivery services. Upon receiving the confirmation information, the secure device 100 may then generate its own image or stream of images, as shown in block 1160. The image or stream of images generated by the secure device 100 may include relevant information relating to the transaction including, for example, the confirmation information. The image or stream of images may then be presented to the register for scanning. Upon retrieving the image or stream of images from the secure device 100, the register may then derive the relevant information and confirm that the transaction has been paid for and proceed to conclude the transaction, as shown in block 1170.

Figure 12:
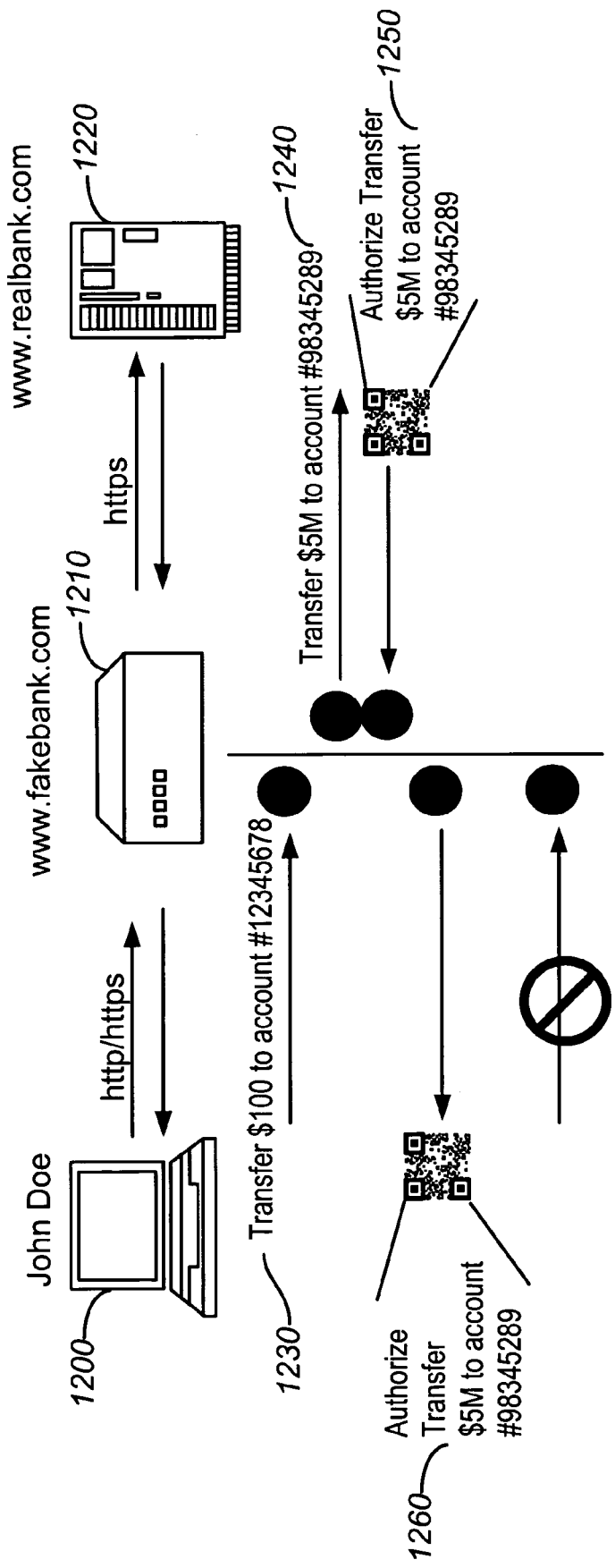
FIG. 12 is a simplified schematic diagram illustrating one phishing-prevention application of the secure device according to one embodiment of the present invention.

In yet another illustrative application, the secure device 100 can be used to defend against real-time phishing attacks, as shown in FIG. 12. Phishing attacks involve fraudulently capturing information from a user, for example, via a fake website, and then using such information to conduct unauthorized transactions. At 1230, a user 1200 unknowingly provides information to a fake website 1210, thinking that s/he is dealing with the legitimate website 1220. At 1240, the fake website 1210, upon capturing the information, then uses such information to contact the legitimate website 1220 and attempts to conduct an unauthorized transaction. At 1250, in order to confirm the transaction, the legitimate website 1220 generates an image or a stream of images that requires confirmation by the secure device 100. The image or stream of images may include confirmation information relating to the transaction. If the image or stream of images is forwarded to the secure device 100, as shown in 1260, the secure device 100 may then derive the confirmation information and display such information to the user, thereby allowing the user to detect that an unauthorized transaction has been attempted. The user may then terminate any connection to the fake website 1210. Alternatively, the legitimate website 1220 may include warning information in the image or stream of images, such as, information alerting the user to disconnect from the website 1210 and re-connect to the legitimate website 1220 directly. To guarantee only the legitimate user visits the legitimate website 1220, the information embedded in the image or stream of images may include a unique but randomly generated number. Such a number may be combined with the URL of the website to form a unique URL for a specific user for a specific period of time. Upon deriving the relevant information from the image or stream of images, the secure device 100 may then display such information to the user, thereby alerting the user to potential fraud and unauthorized transactions and also providing the user the unique URL that the user has to enter in a browser.

The legitimate website 1220 may also detect a legitimate user by using a cookie stored at the computer associated with the user. A cookie is a message stored in a text file and given to a Web browser by a Web server. The message is then sent back to the server each time the browser requests a page from the server. The main purpose of cookies is to identify users and possibly prepare customized Web pages for such users. A website can detect that a user has never used a particular computer to visit that website by requesting cookies stored in a browser associated with that computer. The cookie stored by the browser can uniquely identify a user. In the absence of the cookie, the website may request the user to visit the unique URL as described above.

In addition to the applications described above, the present invention can also be deployed in various other types of applications including, for example, digital signatures, encryption, secure ATM cards and secure credit cards, etc. Based on the disclosure and teachings provided herein, a person of ordinary skill in the art should know how to deploy the present invention in many other types of applications.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the embodiments disclosed herein may be embodied directly in hardware, in a software module executable by a processor, or in a combination of both, in the form of control logic, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit of scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

What is claimed is:

1. A system for providing secure document distribution, the system comprising:
   an application configured to:
      allow an author to create a document;
      allow the author to secure the document using an access code, wherein the access code is needed to gain access to the document;
      generate an image, the image having information embedded therein, the embedded information including the access code encoded in an encrypted format; and
      forward a message to a recipient, wherein the message includes the document and the image;
   a terminal configured to allow the recipient to open the message; and
   a portable device configured to:
      allow the recipient to capture the image;
      store predetermined information, wherein the predetermined information is usable to decrypt the access code embedded in the image;
      capture input information from the recipient, the input information to be used to ensure that the recipient is authorized to use the portable device; and
      generate an output based on the information embedded in the image and the predetermined information, the output including the access code;
   wherein the terminal is further configured to receive the output generated by the portable device and evaluate the output to determine if the recipient is allowed to access the document.

2. The system of claim 1 wherein the portable device is further configured to generate the output using the input information captured from the user.

3. The system of claim 1 wherein the portable device is further configured to decode the information embedded in the image for use in generating the output by using a cryptographic algorithm.

4. The system of claim 1 wherein the input information includes one of a personal identification number and biometric information.

5. The system of claim 1 wherein the image includes a barcode.

6. The system of claim 5 wherein the barcode includes a multi-dimensional barcode.

7. The system of claim 1 wherein the image includes a set of barcodes.

8. The system of claim 7 wherein the set of barcodes includes a set of multi-dimensional barcodes.

9. The system of claim 1 wherein the portable device is further configured to display the output to the user; and
   wherein the terminal is further configured to receive the output, or a portion thereof, from the user.

10. The system of claim 1 wherein the portable device includes one of a cellphone and a personal digital assistant.

11. The system of claim 1 wherein the message includes an email.

12. A system for providing secure document distribution, the system comprising:
   an application configured to:
      allow an author to secure a document using an access code, wherein the access code is needed to gain access to the document;
      generate an image, the image having information embedded therein, the embedded information including the access code encoded in an encrypted format;
      create a message to a recipient;
      attach the document and the image to the message; and
      forward the message to the recipient;
   a terminal configured to allow the recipient to open the message; and
   a portable device configured to:
      allow the recipient to capture the image;
      store predetermined information, wherein the predetermined information is usable to decrypt the access code embedded in the image;
      capture input information from the recipient, the input information to be used to ensure that the recipient is authorized to use the portable device; and
      generate an output based on the information embedded in the image and the predetermined information, the output including the access code;
   wherein the terminal is further configured to receive the output generated by the portable device and evaluate the output to determine if the recipient is allowed to access the document.

13. The system of claim 12 wherein the portable device is further configured to generate the output using the input information captured from the user.

14. The system of claim 12 wherein the portable device is further configured to decode the information embedded in the image for use in generating the output by using a cryptographic algorithm.

15. The system of claim 12 wherein the input information includes one of a personal identification number and biometric information.

16. The system of claim 12 wherein the image includes a barcode.

17. The system of claim 16 wherein the barcode includes a multi-dimensional barcode.

18. The system of claim 12 wherein the image includes a set of barcodes.

19. The system of claim 18 wherein the set of barcodes includes a set of multi-dimensional barcodes.

20. The system of claim 12 wherein the portable device is further configured to display the output to the user; and
   wherein the terminal is further configured to receive the output, or a portion thereof, from the user.

21. The system of claim 12 wherein the portable device includes one of a cellphone and a personal digital assistant.

22. The system of claim 12 wherein the message includes an email.

* * * * *